March 18, 1969  
J. W. MILLIGAN  
3,434,084  
METHOD OF MAGNETIZING MAGNETS FOR  
A REPULSION TYPE OF SUSPENSION  
Original Filed Aug. 14, 1961  
Sheet 1 of 2
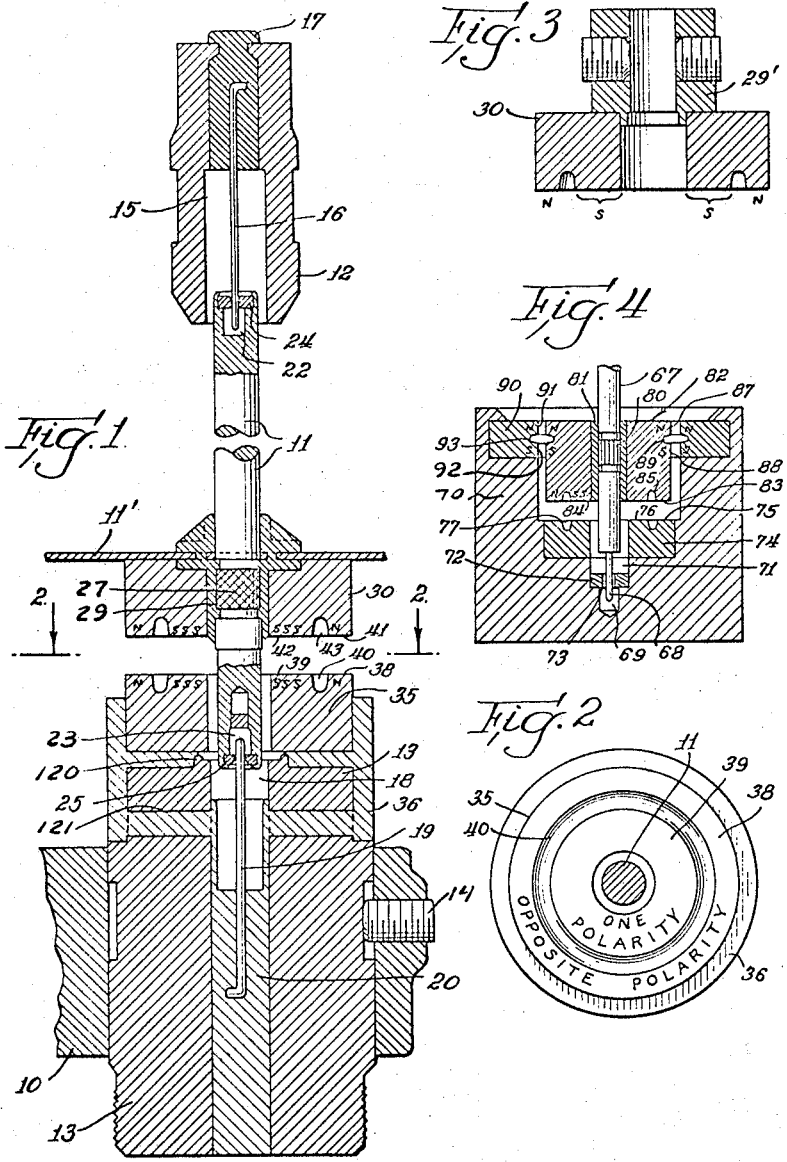
INVENTOR.  
James W. Milligan  
INVENTOR.  
BY  
Darbo, Robertson & Vandenburgh March 18, 1969     J. W. MILLIGAN     3,434,084
METHOD OF MAGNETIZING MAGNETS FOR
A REPULSION TYPE OF SUSPENSION
Original Filed Aug. 14, 1961     Sheet 2 of 2
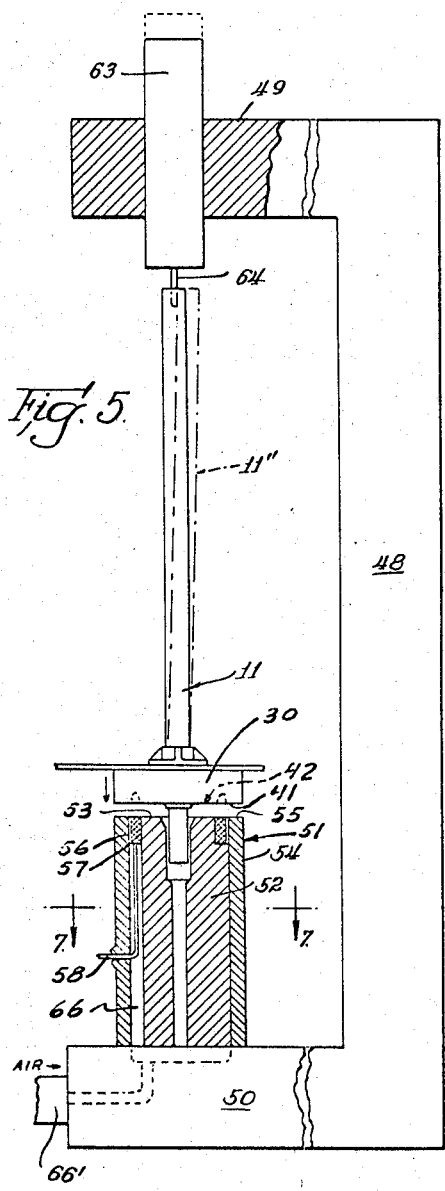
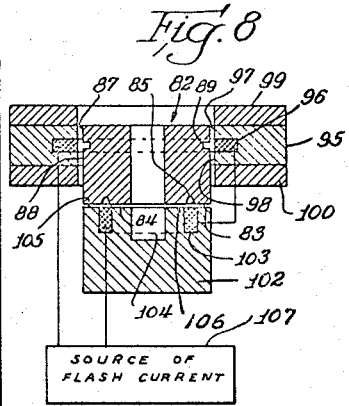
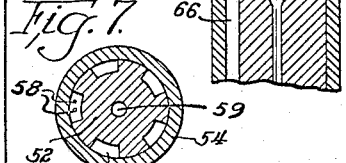
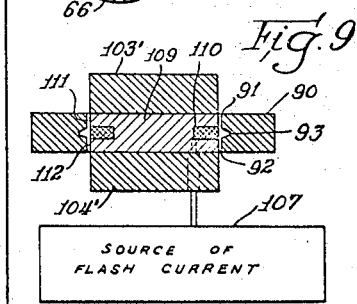
INVENTOR.
James W. Milligan

United States Patent Office 3,434,084
Patented Mar. 18, 1969

3,434,084
METHOD OF MAGNETIZING MAGNETS FOR A REPULSION TYPE OF SUSPENSION
James W. Milligan, West Lafayette, Ind., assignor to Duncan Electric Company, Inc., a corporation of Indiana
Original application Aug. 14, 1961, Ser. No. 131,286. Divided and this application Oct. 23, 1965, Ser. No. 504,257
U.S. Cl. 335—284       5 Claims
Int. Cl. H01f 7/20, 13/00

ABSTRACT OF THE DISCLOSURE

A magnetic suspension for meter disks and the like comprises a pair of opposing magnets, each in the form of a molded button with two concentric annular poles facing axially. Each magnet is magnetized by face-to-face contact with a fixture completing a path of magnetic metal between the two pole faces. The same fixture is then used for a partial knockdown of the magnet to make it stable. If a magnet is mounted on a shaft without true perpendicularity of the magnet face to the shaft axis its position is shifted, with a compensatory effect.

---

This application is a division of Ser. No. 131,286 entitled "Magnetic Repulsion Type of Suspension," filed Aug. 14, 1961, still pending.

Various pieces of apparatus have shafts which must be rotatable with a very small amount of friction, often with a requirement of remaining stable for years. A common example is the watt-hour meter (the familiar "electric meter" of the home). Another example is a gyroscope. In the past, various structures have been devised for reducing the frictional drag upon a shaft of such a structure. One of these, especially suitable when the shaft is substantially vertical, is to suspend it magnetically so that the weight of the rotor does not ride on a thrust bearing with its attendant frictional drag, and danger of increasing drag due to dirt or wear. Although such magnetic suspensions have been successfully used, they have been subject to recognized defects.

In casual theory, magnetic suspension or support would seem to be ideal for reducing the frictional drag of the shaft supports. Upon more careful examination, the theory has drawbacks. One is lack of lateral stability. If the rotor moves slightly off center there results a magnetic side thrust. This necessitates a centering bearing, which in turn reintroduces rotational drag on the shaft, wear problems, etc. Also, past magnetic suspensions have been too delicate or "soft." A change in positioning can change the application of forces to the meter disk, affecting the accuracy of meter operation. In a "soft" suspension, a minute change of magnetic strength produces a relatively great change of positioning. Also, in actual practice, there have been other faults, such as sensitivity to temperature changes and to external magnet fields. Also, if the magnetic fields from the two coacting pole faces both have any unevenness in the strength about the axes, this will act to produce unwanted locking forces, causing the shaft to seek a particular angular position and resisting the start of rotation.

An object of the present invention is to provide a structure for electric meters or the like which will ameliorate the problems encountered with prior art devices and methods. Through the use of the invention, the shaft is stably supported and the decentering side thrust introduced by magnetic fields of the support, when other forces cause minor decentering, is relatively low. As a result, the extent to which the centering bearings must hold the shaft bearing is lessened, with a corresponding reduction of wear and fractional drag in the shaft bearings. In fact, the support by magnetic repulsion with centering also by magnetic repulsion, in accordance with one form of my invention, is designed to resist such side-shifting of the shaft as may be introduced by other factors. Also, as a result of the design, and of the highly stable nature of the magnetic material, especially as used, external influences have amazing little effect.

This is all accomplished with a repulsion type magnetic suspension which has an inherent advantage of magnetically expelling any "magnetic dirt" which would gather in the gap of a magnetic suspension of the attracting poles type.

Further objects and advantages of my invention will become apparent from the following description taken in conjunction with the drawings in which:

Designation of figures

FIGURE 1 is an elevational sectional view of a portion of an electric watt-hour meter embodying my invention;

FIGURE 2 is mainly a face view of one magnet, being also a section as viewed at line 2—2 of FIG. 1;

FIGURES 3 and 4 are vertical sectional views of modified constructions;

FIGURE 5 is a sectional view of a fixture for magnetizing the shaft-mounted magnet of FIG. 1;

FIGURE 6 is a vertical sectional view of alternative apparatus for magnetizing the magnets of FIGS. 1 and 3;

FIGURE 7 is a horizontal sectional view taken along the line 7—7 of FIG. 5.

FIGURE 8 is a sectional view of apparatus for magnetizing the shaft magnet of FIG. 4.

FIGURE 9 is a sectional view of an apparatus for magnetizing the ring magnet of FIG. 4.

General description

Although the foregoing disclosure offered for public dissemination is detailed to insure adequacy and so aid understanding, this is not intended to prejudice that purpose of a patent which is to cover each new inventive concept therein, no matter how others may later disguise it by variations in form or additions or further improvements. The following claims are intended as the chief aim toward this purpose, as it is these that meet the requirement of pointing out the parts, improvements, or combinations in which the inventive concepts are found.

Referring to FIGURES 1 and 2, there is illustrated a portion of an electric watt-hour meter having a frame generally 10 and a vertical, rotating, shaft generally 11, carrying a disk 11'. The associated elements of the meter such as driving and retarding magnets are well known but are not shown. Their structure and relationship to the illustrated device will be understood by those skilled in the art.

The upper end of the shaft 11 is guided by a pin 16 running in a graphite bearing 24. The weight of the shaft is suspended by magnetic repulsion between magnets 30 and 35, rotor magnet 30 being fast on shaft 11, and stator magnet 35 being fixed in stud or holder 13.

Magnets 30 and 35 are substantially identical. In accordance with the present invention their four permanent magnet pole faces all face axially, are close together, and of the same area, and like poles are directly opposite one another. Thus the outer pole faces 38 and 41 (having the same polarity) are of the same area as the inner pole faces 39 and 42, and the grooves or spaces 40 and 43 each between the two pole faces of one magnet, are quite narrow, in fact narrower in the illustrated form than either pole face. This arrangement, with proper magnetization to support the rotating element with the illustrated gap between magnets 30 and 35 (about .05")
provides a very stiff suspension, and one in which the
magnetic side thrust resulting from minute displacements
is very small. During normal operation, pin 19 and
graphite ring 25 (having a running fit with pin 19) confine the lateral movement of magnet 30 to such minute
lateral displacements that magnetic side thrust is extremely low.

Detailed description

Frame 10 (only outstanding bosses of which are
shown) carries an upper mounting stud 12 and a lower
mounting stud 13. Each of the studs are circular in a
transverse cross-section. They are received in suitable
openings in the frame bosses 10 and held in place by cap
screws 14. Stud 12 has an axial bore or cavity 15 of
cylindrical configuration with a small rod or centering
pin 16 extending along the axis of the bore. Pin 16 is
held in place by a die-cast plug 17. Similarly stud 13
has a bore or cavity 18 and a rod or centering pin 19
along the axis thereof which rod is held in place by plug
20. Pins 16 and 19 are accurately centered by virtue of
being held centered while plugs 17 and 20 are die-cast.

At each end of shaft 11 are cavities 22 and 23 respectively. Cavities 22 and 23 are cylindrical in shape with
their cylindrical axes coinciding with the axis of shaft 11.
Secured in one end of shaft 11 at the mouth of cavity
22 is a graphite bearing 24 having the opening aligned
with the axis of shaft 11, in which opening pin 16 is
journaled. A corresponding bearing 25 is secured to the
opposite end of shaft 11 at the mouth of cavity 23.

Near the lower end of shaft 11 is a knurled section 27
these cooperating to ensure dependable positioning of
magnet 30. While rotor magnet 30 is held accurately
centered on the shaft 11, binding metal 29 is die-cast
in place. Alternatively (as in FIG. 3) the magnet 30
may be cemented to a collar 29 with which centering is
ensured by interfitting parts, and which snugly fits the
shaft and is tightened thereon by setscrews.

Lower magnet 35 is bound to stud 13 by die-cast metal
36, which may be applied at the same time as plug 20.

Magnets 30 and 35 are identical. Magnet 35 includes
an outer annular pole face 38 and an inner annular pole
face 39. As illustrated, the two pole faces are separated
by a groove 40. Likewise magnet 30 has an outer annular
pole face 41 and an inner annular pole face 42 separated
by a groove 43. The grooves 40 and 43 are valuable, but
not always essential. It will be noted in FIGS. 1 and 2
that pole faces 39 and 42 are wider than pole faces 38
and 41. This is done so that the area of pole faces 39
and 42 is approximately equal to the area of pole faces
38 and 41, respectively.

Although best results are attained with approximate
equality in area, perfection is not essential. However,
any departure from area equality is believed detrimental
or wasteful. With more than somewhere around a 40%
difference in area between the outer pole faces and the
respective inner pole faces, the added increments of metal
of the larger pole will be functioning mainly in the inferior manner of a magnet having only one of its poles
in a repelling position.

Magnets 30 and 35 are magnetized so that the outer
pole faces 41 and 38 are of the same polarity and the
inner pole faces 42 and 39 are both of the opposite
polarity. In the illustrated embodiment the former are
designated north poles while the latter are designated
south poles. However, the polarity of both magnets could
be reversed without significance depending upon the
choice of the manufacturer. The use of the designations
N and S in the drawing is merely to illustrate the relative polarity of the two pole faces. It is intended that the
magnets 30 and 35 have the same relative strength at all
angles of rotation about the axis of shaft 11. Thus the
magnetic field about either one of the magnets is roughly
that of a semi-toroid, with the plane of pole faces 41 and
42, for example, approximately bisecting the toroid, and
being normal to the axis about which the toroid was
formed. The pins 16 and 19 which have been used are
0.019 inch in diameter. Because of their small size, zero
or very small bearing load, and their being journaled in
the graphite bearings 24 and 25, the frictional drag to
the rotation of shaft 11 is extremely small. During normal
operation, these pins resist any side thrust so that lateral
shifting is extremely small. However, the structure is
adequately protected in another way against shock damage, as in shipment. Thus with the ends of shaft 11 received in cavities 15 and 18, the shaft is thereby restrained against excessive lateral movement.

There is also protection against excessive axial displacement, which would otherwise be likely to occur in shipment. Thus pins 16 and 19 have suitably small clearance,
such as .010" to .015", with the ends of cavities 22 and
23. The latter may be formed by an inserted end stop
bearing to allay fears of purchasers who know such
end stops have been needed heretofore and may not at
first have confidence in the exceptional degree of insensitivity to temperature changes here achieved.

Magnetizing fixture and method

A fixture for magnetizing magnet 30 is illustrated in
FIGURE 5. It includes a frame generally 48 having an
upper arm 49 and a base arm 50. An electro-magnet,
generally 51, is mounted on base arm 50. It includes a
core 52 of "soft" magnetic material, the upper portion
of which is annular in shape and defines annular pole
face 53. A casing 54 of soft magnetic material surrounds
core 52 and defines an annular pole face 55. Pole faces
53 and 55 lie in a common plane are are separated by
a gap 56. The configuration of pole faces 55 and 53
corresponds to the configuration of pole faces 41 and
42, respectively. Between core 52 and casing 54 in gap
56, (in the illustrated form) are the windings of a coil
57 energized through a pair of wires 58. The projecting
portion of shaft 11, immediately below pole face 42 fits
snugly into bore 59 of core 52 to center magnet faces
41 and 42 with the corresponding faces 53 and 55 of the
magnetizer.

It may be noted in this connection that the provision
of grooves 40, 43 is quite desirable in reducing the need
for extremely precise centering of the magnet pole faces
on the pole faces of the magnetizer. It has been found
tolerable, with grooves 40 and 43 provided, to have the
bore 59 of a diameter .002" larger than the diameter of
the interfitting portion of shaft 11. The limit has not been
determined.

It is also important that the windings of coil 57 extend
quite close to the plane of the magnetizer pole faces 53
and 55. Likewise the coil should be concentrated very
close to this area so that a large proportion of the total
ampere-turns will be in this area. It has been found possible to saturate the permanent magnets by using 11,000
to 12,000 ampere turns in a coil extending from .005"
to .150" from the plane of the faces. The turns of the
coil should be firmly bound together, as by high temperature shellac also used for coating the wire for insulation.

With these various contributing factors, it has been
found that magnets can be produced of exceptionally high
magnetic uniformity about the axis and with very nearly
the maximum pole face strength of which a given magnet
is capable. By "pole faces" is, of course, meant the faces
at the ends of that portion of the main magnetizing flux
path lying within the permanent magnet. In the case of
magnet 30 these would obviously be faces 41 and 42
since they are in contact with the iron of the magnetizing
unit. To distinguish these faces more clearly from faces
adjacent to them, where some leakage flux may escape,
each of the faces such as faces 41 and 42 can be designated "a face of greatest concentration of flux of that
face's polarity" or "a face containing a polarity center."

Stabilizing magnetic knock-down

As is well known in regard to magnets in general, after magnetization they should be subjected to a partial knock-down or demagnetization for stabilization purposes. This may be accomplished in the case of the illustrated magnets in conventional manner as by insertion in an alternating field of constant strength ad removal therefrom.

Preferably wires 58 are connected to a source of flash current, e.g. a current of high intensity and short time duration. Such devices are well known in the art, and their current may be derived from condenser discharge. The magnet to be energized, for example magnet 30, is placed in position in the electromagnet. A flash of heavy magnetizing current is passed through coil 57 to magnetize the magnet to saturation. Thereafter, if stabilization is to occur on the same fixture, a demagnetizing current, which may be of reverse polarity, or oscillatory, of much less strength is passed through coil 57 to partially demagnetize and stabilize the magnet. The residual magnetism of the two magnets should be such as to support the desired weight with the desired axial distance between the corresponding faces e.f. faces 38 and 41, of the magnets when in use. In a particular specific embodiment the strengths of the magnetic fields (and of the demagnetizing current) required to achieve this spacing fairly closely can be readily determined empirically. Also, a special demagnetizing set up can be provided to give a final increment of demagnetization, progressively increasing the strength of successive spaced impulses until the exact desired residual flux value is attained.

Demagnetization with compensation

The plane defined by the pole faces 38 and 39 and that of pole faces 41 and 42 should be parallel to each other and normal to the axis of shaft 11. In order to obtain the advantage of less expensive manufacturing operations, some minute errors may be encountered. To minimize their effect, the following novel method for magnetizing and stabilizing magnet 30 can be employed.

Referring to FIGURE 5 there is on arm 49 a plug 63 carrying a pin 64 which is receivable in bearing 24 (FIG. 1) of shaft 11. Plug 63 is mounted in arm 49 so as to be vertically movable with respect to the arm. Pin 64 and bore 59 are positioned so that their axes are coincident and very accurately normal to the plane defined by pole faces 53 and 55. In other words, the faces 53 and 55 are accurately formed as surfaces of revolution about the axis of pin 64 and bore 59. When magnet 30 and shaft 11 are first inserted into the fixture, plug 63 is raised so that pin 64 does not enter the bearing in the top end of shaft 11. If the axis of shaft 11 is not normal to the plane of pole faces 41 and 42, shaft 11 will be cocked off to one side as illustrated in dotted lines at 11''. The magnet 30 will assume a position at which pole faces 41 and 42 are in full face-to-face contact with pole faces 55 and 53. The initial magnetizing current is now passed through coil 57. After the initial magnetizing of the magnet, shaft 11 is moved to a position at which pin 64 will enter the bearing in the top of the shaft. In production, a quicker or more automatic device will probably be provided for centering the shaft on its proper axis. In any event, the shaft 11 is now held in the position illustrated in full lines in FIG. 5. While the movement of shaft 11 to achieve this repositioning may be very small, if enough to be significant it will result in some loss of the face-to-face contact between the pole faces of the magnetizing magnet 51 and the pole faces of the magnet 30. With the shaft 11 held in the full line position, except that magnet 30 rests on magnet 51 as indicated by the arrow, the de-magnetizing current now is passed through coil 57. The areas of magnet 30 fully in contact with the poles of electro-magnet 51 will be de-magnetized the greatest amount. To the extent that there is an air gap between other portions of the pole faces 41 and 42 with respect to the pole faces 55 and 53, respectively, a lesser amount of de-magnetization will occur. The larger the gap, the smaller will be the amount of demagnetizing of that portion of magnet 30. Thus, when the shaft with its magnet is mounted as illustrated in FIG. 1, to the extent that there is a cocking of magnet 30 on shaft 11 with one side of magnet 30 being closer to magnet 35 than is the opposite side of magnet 30, that one side of magnet 30 (the close side) will have a smaller residual magnetism. The greater residual magnetism at the area of greatest spacing will tend to compensate for this greater spacing, and near equality of magnetic field along a perpendicular plane results.

Although this compensating demagnetization is available if needed, present experience indicates that sufficiently accurate mounting of magnets 30 and 35 can be achieved in production so that it will not be required.

Magnetizer for shaftless magnets

In FIG. 5 magnet 30 was centered by interfitting of its shaft 11 with bore 59.

FIG. 6 shows a construction suitable for magnetizing magnets which are not mounted on shafts. The construction of the electromagnet portion is similar to that of FIG. 5, except that instead of having a bore 59 into which a shaft extends it is provided with a centering dowel 65 which snugly fits into the bore or central aperture of the magnet to be magnetized.

Air-cleaning of magnetizers

Preferably the magnetic cores 52 are provided with slots 66 along their cylindrical faces, these slots extending axially as seen best in FIGS. 5 and 6. The coil lead wires may extend through one such slot. As seen in FIG. 7 there may be several such slots spaced around the core 52. Preferably these slots communicate with a hose 66' for supplying compressed air. This air will help keep the pole faces of the magnetizer clean by blowing past the outside of coil 57 which is tightly mounted on core 52 but has a slight clearance with shell 54.

Magnetic suspension with repulsion centering

FIG. 4 illustrates the lower portion of a shaft 67 generally corresponding to shaft 11. The upper end of shaft 67 (not shown) might be mounted in a bearing structure corresponding to the upper mounting of shaft 11. Projecting from the bottom of shaft 67 is a pin 68 which may be quite stiff. It is shorter and may be of larger diameter than pins 16 and 19. Pin 68 extends into a cavity 69 in a support block 70. Support block 70 would be mounted on a suitable frame such as frame 10 of FIG. 1.

Above cavity 69 is an enlarged cavity 71 at the bottom of which is seated a graphite bearing 72. Bearing 72 has an axial opening 73 to receive pin 68 quite loosely. Surrounding the bottom end of shaft 67 is a support magnet 74 which may be identical to magnet 35 of FIG. 1. Magnet 74 has an outer annular pole face 75 and an inner annular pole face 76, corresponding to pole faces 38 and 39, respectively. The two pole faces 75 and 76 may be separated by a groove 77.

Rotor magnet 82 is secured about a knurled section 80 of shaft 67 by metal 81 die cast in situ. Magnet body 82 is cylindrical in shape. Its bottom plane is provided with an outer annular pole face 83 and an inner annular pole face 84 which may be separated by a groove 85. The shape and size of pole faces 83 and 84 correspond to those of pole faces 75 and 76.

About the periphery of magnet body 82 adjacent the upper end thereof are a pair of circumferential pole faces 87 and 88, which may be separated by a groove 89. An annular magnet 90 has a pair of inner circumferential pole faces 91 and 92 separated by a groove 93.

Pole faces 87 and 91 are of one polarity while pole faces 88 and 92 are of the opposite polarity. Thus the magnetic field between the upper magnet of body 82 and the ring magnet 90 is such that these magnets act to repel each other and will serve to center shaft 67 to coincide with the vertical axis of pole faces 91 and 92. Pole faces 83 and 75 also are of one polarity, with pole faces 76 and 84 being of the opposite polarity. Thus the bottom magnetic portion of magnet body 82 will be supported by the repelling magnetic force between that magnet body and magnet 74. If the forces applied to the rotating element of which spindle 67 is a part are fairly light or well balanced as to lateral forces on spindle 67, pin 68 will presumably never touch bearing 72 during normal operation, and ordinary friction will be zero.

Similar results are expected from a single pair of nested magnets with faces of conical shape. Thus each magnet is to have both of its faces lying in a surface of revolution about the axis which would be generated by a line olique to the axis. The groove between the poles of one magnet should be displaced from the other along a cone perpendicular to the cones of the faces. The outer magnet may have its inner face extended to the same internal diameter as the opposing inner face, and its outer face extended to the horizontal plane of the outer diameter of the opposing outer pole.

Stator magnet 74 may be magnetized on an electromagnet such as that illustrated in FIG. 5. FIGURES 8 and 9 respectively illustrate the fixtures for magnetizing magnet body 82 and ring magnet 90. Referring to FIG. 8, there is an annular core 95 of soft magnetic material having a slot therein to receive the electrical windings 96. At the same time the slot holding winding 96 defines a pair of circumferential pole faces 97 and 98. A pair of annular rings 99 and 100 are positioned at opposite sides of core 95. The rings 99 and 100 are made of an electro-conductive, non-magnetic, material such as copper.

The bottom face of magnet body 82 is magnetized by an electro-magnet which includes a core 102 having a slot in the upper face thereof to receive winding 103. The slot receiving winding 103 together with the axial opening 104 define annular pole faces 105 and 106 in juxtaposition to pole faces 83 and 84, respectively. Windings or coils 96 and 103 are suitably connected to a source of flash current 107 such as that used to energize coil 57 of the embodiment of FIG. 5. As in the embodiment of FIG. 5, coils 96 and 103 are first energized by a relatively large impulse current of one polarity to magnetize magnet body 82 to saturation. Thereafter a smaller impulse current of reverse polarity may be passed through coils 96 and 103 to partially de-magnetize the magnet body. Coils 96 and 103 have been shown connected in series to indicate that they are energized exactly in unison, so that neither will adversely affect the magnet the other magnetizes.

FIG. 9 shows the fixture for magnetizing magnet 90. A generally cylindrical core 109 has a slot therein to receive a winding 110. The slot within which winding 110 is positioned defines a pair of peripheral pole faces 111 and 112 generally corresponding to pole faces 91 and 92 of magnet 90. A pair of cylindrical copper disks 103' and 104' are positioned at opposite sides of core 109. Winding 110 is connected to the source of flash current 107. Initially it is energized by a relatively high current to saturate magnet 90. Thereafter it may be energized by a somewhat lower current of opposite polarity to partially demagnetize magnet 90. As made clear by my application resulting in Patent No. 3,114,582, rings 99, 100, 103' and 104', with the flash magnetizing current indicated, substantially confine the magnetizing flux to flux entering the pole faces perpendicularly, this effect being inevitably achieved in FIG. 6 by the contact of the magnetized and magnetizing faces in a closed magnetic circuit.

Magnetic considerations

To achieve the objects of my invention to best advantage it is important as has been noted that the width of grooves 40 and 43 (as measured along a radial line) be quite small. The correct dimension for optimum results may vary, but it now appears that for safe achievement of these results the width of the gaps 40, 43 should not be in excess of 3 mm., as it is believed that size would be inferior to the dimensions given below. Magnets 30 and 35 as now most thoroughly tested have an overall diameter .564" and a bore diameter .156", the width of grooves 40 and 43 as measured along a radius is .043". Pole face 39 has a radial dimension of .107" and pole face 38 has a radial dimension of .054. The magnets as measured along the axis of shaft 11 may be .187" thick. The magnets may be made of one of the materials well known to the art for forming high coercive permanent magnets, such as one of the alloys sold under the trade name Alnico. A very high coercive material (at least 650 oersteds) should be used. Present preference is a molded composition of Alnico VII powder bound by a stable, thermosetting resin with a high heat-distortion temperature. Although the magnetized suspension of FIG. 4 has not yet been constructed, the smallness of magnetic side thrust encountered with the FIG. 1 type of suspension suggests that the FIG. 4 type may achieve complete magnetic stability, even though that has seemed impossible heretofore. At least, it will apparently achieve a condition of minimum magnetic sidethrust caused by minute eccentricity, and if this is all it achieves it should have the same type of centering pin as in FIG. 1. Grooves 89 and 93 should also be not over 3 mm. in width (axial dimension) and preferably as small as practical, e.g. .04".

The FIG. 1 form of the invention has been found exceedingly satisfactory for supporting 16 gram rotating elements, such as single phase meter rotors. On 32 gram elements (2 discs) greater magnetic side thrust is developed by minute eccentric displacement, but it is still within tolerable range, and the suspension is also satisfactory for this heavier rotor. In fact this is the planned first commercial use.

Maintaining a small overall diameter for the magnets is important. Partly this is desirable for reasons of economy and compactness. In addition it shortens the torque arm of any force resulting from lack of perfection in uniformity, thereby making such nonuniformity less objectionable than if it had a longer torque arm, or long leverage. When possible the external diameter of the magnets should be kept at least as small as three-fourths inch. Where greater lifting force is required it would be better to use more pairs of magnets axially separated than to use one pair of magnets of larger diameter.

The outside diameter is kept at a minimum by having both pole faces of one magnet of the same area, and by keeping the separating groove small as measured along a radius; both the factors being desirable for other reasons also. By a resin of high heat distortion temperature is meant one which will withstand at least 250° F. without significant distortion by a moderate applied force. For example, five pounds applied through a 1/16" diameter ball should not leave a depression over .010".

It is important that the stabilizing demagnetization be to a degree such that when the magnets are moved into the closest proximity permitted by the physical dimensions of the parts, they will have no further permanent demagnetizing effect. At present, a demagnetizing field of about 700 oersteds is used, and even face to face contact of the magnets would have no further effect although such contact is prevented. Demagnetization will also determine the length of the axial gap between magnets when a given load is supported. At present an axial gap of about .050" is used with a 35 gram total rotor weight (including the rotor magnet). About .060" to .065" is planned for an 18 gram rotor, using smaller magnets. It will be observed that these axial gaps are longer than the width of the groove separating the magnet faces, by a substantial percentage. A gap slightly shorter than the groove width has also been used, but relative side thrust was increasing and much less than this should apparently be avoided. In other words, axial gap should be at least of the order of approximately equal to the groove width (or separation of the pole faces, if no groove).

Although mention has been made as to each magnet that the separation of its magnetic poles should not be over 3 mm., it is believed that in fact, it should be as little as is practicable. Making it smaller than about .04" appears to be difficult, however, in view of the need to use a large number of ampere turns adjacent to the plane of the pole faces of the magnet being magnetized. Hence, a dimension of about .04" is at present preferred.

Alnico VII should be unoriented (isotropic) and has a composition in percentage by weight of:

| | |
|---|---|
| Cobalt | 24 |
| Nickel | 18 |
| Aluminum | 8½ |
| Titanium | 5 |
| Copper | 3¼ |
| Iron | Remainder |

Precision die-casting

It is, of course, extremely important that the plane of pole faces 38 and 39 lie perpendicular to the axis of holder 13. Features illustrated in FIG. 1 facilitate achieving this in production.

One of the important features is the provision of a deformable annular rib 120 close to the cavity 18 of body 13. In the course of die-casting, the die which engages the pole faces 38 and 39, and which also fits within the central bore of magnet 35 for centering this magnet, is pressed with great force, such as a hundred pounds, toward the portion of the die which holds body 13 accurately centered therein. This force is enough to upset or deform rib 120, the body 13 being of aluminum. Thus, if there is any minute irregularity which causes uneven spacing between magnet 35 and body 13 the annular rib 120 will be deformed to accommodate itself to this irregularity. While the parts are thus held in proper relationship the die-casting metal will be injected. The rib 120 serves to seal the flowing metal from penetrating into the cavity 18 in the vicinity which will later be occupied by the shaft 11.

In order for the die-cast portion 36 to be formed by the same injection as the plug 20, bore 121 is provided transversely through the body 13. Thus the metal can flow from one source to all of the points shown. Of course, the die member which holds magnet 35 is provided with an extension which forms the inner contour of the die-cast metal constituting the bottom portion of cavity 18.

Conclusion

According to this invention an exceedingly stiff magnetic suspension is provided, without excessive side thrust upon minute lateral displacement. In addition, tests have shown that it has amazingly low sensitivity to temperature changes. This suspension has been used with a 32 gram rotor which moves axially only about .003" or less with a temperature variation from minus 40° C. to plus 90° C. This, of course, is far beyond the range to which watt-hour meters are likely to be subjected. For comparison with one of the best prior magnetic suspensions it may be noted that with the same temperature variation a vertical movement at least three times that here indicated would have been expected.

In addition the magnetic suspension of this invention has proved to be exceedingly immune to temporary or permanent magnetic change due to external magnetic fields to which it may be subjected either as a result of intentional tampering or because of surge currents resulting from lightning discharges striking the transmission lines. For example, with one prior commercial magnetic suspension of the repulsion type it has been found that a readily available permanent magnet, when applied to the external meter cover at the right place will so affect the magnets of the magnetic suspension that they will allow the rotor to drop at least .020", or until the magnetic faces engage one another, thereby introducing great rotative friction. With the present invention, the same permanent magnet similarly applied will cause only a drop of the rotor of .004", or less.

What I here claim is:

1. The method of conditioning a permanent magnet on a shaft with a pair of coplanar pole faces generally normal to the axis of the shaft, and using an electromagnet having coplanar pole faces, said method including the steps of: energizing the electromagnet with a magnetizing current while the pole faces of the shaft magnet are in coaxial full face contact with the pole faces of the electromagnet, and thereafter positioning the shaft with its axis normal to the plane of the electromagnet pole faces whereby any deviation from the right-angular relationship between the shaft axis and the plane of the shaft magnet pole faces will result in a corresponding deviation between the plane of the electromagnet pole faces and the plane of the shaft magnet pole faces; and with the magnets so positioned, energizing the electromagnet with a smaller demagnetizing current.

2. The method of conditioning a permanent magnet on a shaft with pole faces generally forming surfaces of revolution about the axis of the shaft and using an electromagnet having a correspondingly shaped pole face, said method including the steps of: energizing the electromagnet with a magnetizing direct current of relatively high intensity while the faces of the two magnets are positioned in full face-to-face contact; and thereafter energizing the electromagnet with a smaller current of reverse polarity while said shaft is held in a position about which the face of the electromagnet is truly a surface of revolution, whereby any nontrueness of the permanent magnet face causes a differential positioning thereof with respect to the electromagnet face, and hence a differential knockdown of the permanent magnet.

3. The method of conditioning a permanent magnet on a shaft with pole faces generally forming surfaces of revolution about the axis of the shaft and using an electromagnet having a correspondingly shaped pole face, said method including the steps of: magnetizing the permanent magnet with uniformity around the axis and partially demagnetizing it by energizing said electromagnet while the permanent magnet is positioned by aligning the shaft selectively as to the electromagnet face whereby any nontrueness of the permanent magnet face causes a differential positioning thereof with respect to the electromagnet face, and hence a differential knockdown of the permanent magnet.

4. The method of magnetizing a permanent magnet having two pole faces slightly spaced apart annularly comprising the steps of positioning face-to-face therewith an electromagnet, having two magnetizing pole faces matching those of the permanent magnet, and an energizing coil substantially annularly between the two magnetizing pole faces, and with the energizing coil of the electromagnet extending substantially to a position representative of a surface coinciding with the permanent magnet faces and forming a continuation thereof, and causing a flash current of heavy amperage to traverse said coil.

5. The method of magnetizing a permanent magnet having two pole faces slightly spaced apart annularly comprising the steps of positioning face-to-face therewith an electromagnet, having two magnetizing pole faces matching those of the permanent magnet, and an energizing coil substantially annularly between the two magnetizing pole faces, and with the energizing coil of the electromagnet extending at least as close as approximately .005" to, and lying entirely within approximately .150" of a position representative of a surface coinciding with the permanent magnet faces and forming a continuation thereof and causing a flash current of heavy amperage to traverse said coil.

References Cited

UNITED STATES PATENTS

| 2,248,272 | 7/1941 | Jurak | 335—284 |
| 2,924,758 | 2/1960 | Weber | 335—284 |

GEORGE HARRIS, *Primary Examiner.*

U.S. Cl. X.R.

308—10